(12) United States Patent
Nakano (10) Patent No.: US 8,069,287 B2
(45) Date of Patent: Nov. 29, 2011

(54) UNIVERSAL SERIAL BUS DEVICE AND METHOD FOR CONTROLLING UNIVERSAL SERIAL BUS DEVICE

(75) Inventor: Manabu Nakano, Aichi (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1742 days.

(21) Appl. No.: 11/065,563

(22) Filed: Feb. 25, 2005

(65) Prior Publication Data
US 2005/0144345 A1 Jun. 30, 2005

Related U.S. Application Data

(63) Continuation of application No. PCT/JP02/13820, filed on Dec. 27, 2002.

(51) Int. Cl.
*G06F 13/00* (2006.01)
*G06F 13/14* (2006.01)
*G06F 13/36* (2006.01)
*H04L 12/28* (2006.01)

(52) U.S. Cl. ......... 710/100; 710/305; 710/314; 370/257

(58) Field of Classification Search .................. 710/100, 710/305, 314; 713/340; 370/257
See application file for complete search history.

(56) References Cited

U.S. PATENT DOCUMENTS

| | | | | |
|---|---|---|---|---|
| 4,724,545 A * | 2/1988 | Hamada | ........................ | 455/218 |
| 6,076,119 A * | 6/2000 | Maemura et al. | ............... | 710/15 |
| 6,205,502 B1 * | 3/2001 | Endo et al. | ..................... | 710/100 |
| 6,363,085 B1 * | 3/2002 | Samuels | ........................ | 370/502 |
| 6,363,491 B1 * | 3/2002 | Endo | ............................. | 713/310 |
| 6,457,086 B1 * | 9/2002 | Duckwall | ..................... | 710/305 |
| 6,559,686 B1 * | 5/2003 | Ge | .................................... | 327/62 |
| 6,744,810 B1 * | 6/2004 | Iyer et al. | ...................... | 375/214 |
| 6,791,950 B2 * | 9/2004 | Wu | ................................ | 370/257 |
| 6,833,738 B2 | 12/2004 | Nakada | | |
| 6,859,645 B2 * | 2/2005 | Yu | ................................. | 455/222 |
| 7,162,555 B2 * | 1/2007 | Kim et al. | ..................... | 710/105 |
| 7,565,557 B2 * | 7/2009 | Wang et al. | ................... | 713/300 |
| 2002/0169915 A1 * | 11/2002 | Wu | ............................... | 710/305 |

FOREIGN PATENT DOCUMENTS

JP 10-301898 11/1998

(Continued)

OTHER PUBLICATIONS

Jim Choate, USB2.0 Electrical Overview, Intel, Jun. 11, 2002.*

(Continued)

*Primary Examiner* — Paul R Myers
*Assistant Examiner* — Christopher A Daley
(74) *Attorney, Agent, or Firm* — Staas & Halsey LLP (57) ABSTRACT

An SE0 timer detects that an SE0 state of a universal serial bus continues for 3 ms or more, and asserts an SE03ms detected signal to a suspending/reset discriminating circuit. The suspending/reset discriminating circuit connects a pull-up resistor to a D+ data line, detects that the universal serial bus is in the SE0 state, and asserts a reset detected signal to a reset control circuit. The reset control circuit asserts a threshold level changing signal to a receiver for a high-speed mode. The receiver changes the threshold into 250 mV. When the reset control circuit detects a K state of the universal serial bus after chirp driving K is executed and ended, the reset control circuit negates the threshold level changing signal to the receiver. The receiver changes the threshold back to 125 mV.

10 Claims, 9 Drawing Sheets

FOREIGN PATENT DOCUMENTS

| | | |
|---|---|---|
| JP | 10-301899 | 11/1998 |
| JP | 11-224144 | 8/1999 |
| JP | 2002-312085 | 10/2002 |
| JP | 2002-344540 | 11/2002 |
| JP | 2002-344542 | 11/2002 |

OTHER PUBLICATIONS

Intel, USB Transeiver Macrocell Interface Specification, Mar. 29, 2001.*

Jerome Tjia, High-Speed Detection Handshake Considerations, May 9, 2001, Philips Semiconductors.*

Jerome Tjia: High-Speed Detection Handshake Considerations USB. ORG May 9, 2001, XP002421757: Retrieved from the Internet: URL http://www.usb.org/developers/presentations/pres0501/Tjia_HS_Detection_Final.ppt : [Retrieved on Feb. 22, 2007] *p. 16*.

Compaq, Hewlett-Packard, Intel, Lucent, Microsoft, NEC, and Philips: "Universal Serial Bus Specification 2.0 (Chapter 5)" USB. ORG, [Online] Apr. 27 2000, XP002421758 : Retrieved from the Internet: URL: http://www.usb.org/developers/docs/usb_20_05122006.zip> [Retrieved on Feb. 22, 2007] *Figure 5-1*.

"Universal Serial Bus Specification 2.0 (Chapter 7)" Universal Serial Bus Specification, XX,XX Apr. 7, 2000, pp. 119-194, XP002348936 *paragraph [7.1.4.2]*.

Compaq, Hewlett-Packard, Intel, Lucent, Microsoft, NEC, Philips: "Universal Serial Bus Specification 2.0 (Appendix C)" USB.ORG, [Online] Apr. 27, 2000, XP002423307: Retrieved from the Internet: URL: http://www.usb.org/developers/docs/usb_20_05122006.zip> [retrieved on Feb. 22, 2007] *paragraph [C.2]*.

Japanese Office Action issued in priority Japanese Application No. 2004-544170 dated May 16, 2006.

* cited by examiner

UNIVERSAL SERIAL BUS DEVICE AND METHOD FOR CONTROLLING UNIVERSAL SERIAL BUS DEVICE

This application is a continuing application, filed under 35 U.S.C. §111(a), of International Application PCT/JP02/13820, filed Dec. 27, 2002.

BACKGROUND OF THE INVENTION

1) Field of the Invention

The present invention relates to a universal serial bus (USB) device, and more particularly to a USB device that is compatible with USB 2.0 standard.

2) Description of the Related Art

Recently, USB hosts (hereinafter, "HS hosts") that are compatible with the USB 2.0 standard, and USB devices (hereinafter, "USB 2.0 compatible devices") that are connected to such USB hosts have come into practical use. However, some of the HS hosts are not technically compatible with the USB 2.0 standard. Accordingly, there is a requirement of USB 2.0 compatible devices that can be connected to such USB 2.0 incompatible HS hosts in a high-speed mode with transmission speed of 480 megabytes per second (Mbps).

Figure 7:
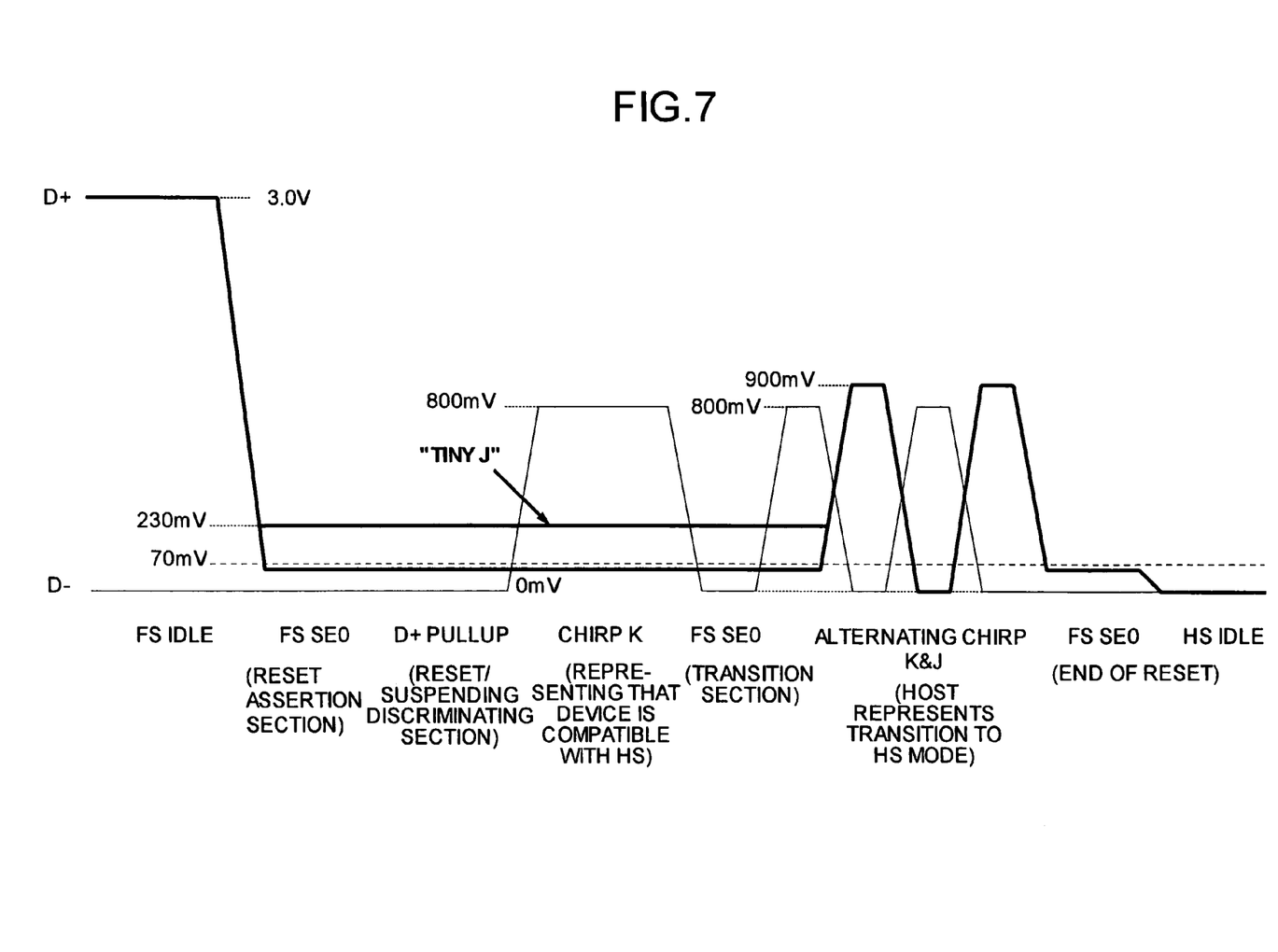
FIG. 7 depicts a change in a USB bus when a high-speed mode is selected at the time of handshaking during reset.

The USB 2.0 compatible devices are connected to the USB hosts according to the standards of the hosts in the high-speed mode or a full-speed mode with transmission speed of 12 Mbps. FIG. 7 depicts a change in a USB bus when the high-speed mode is selected at the time of handshaking during reset, and FIG. 8 depicts a change in the USB bus when the full-speed mode is selected.

Figure 8:
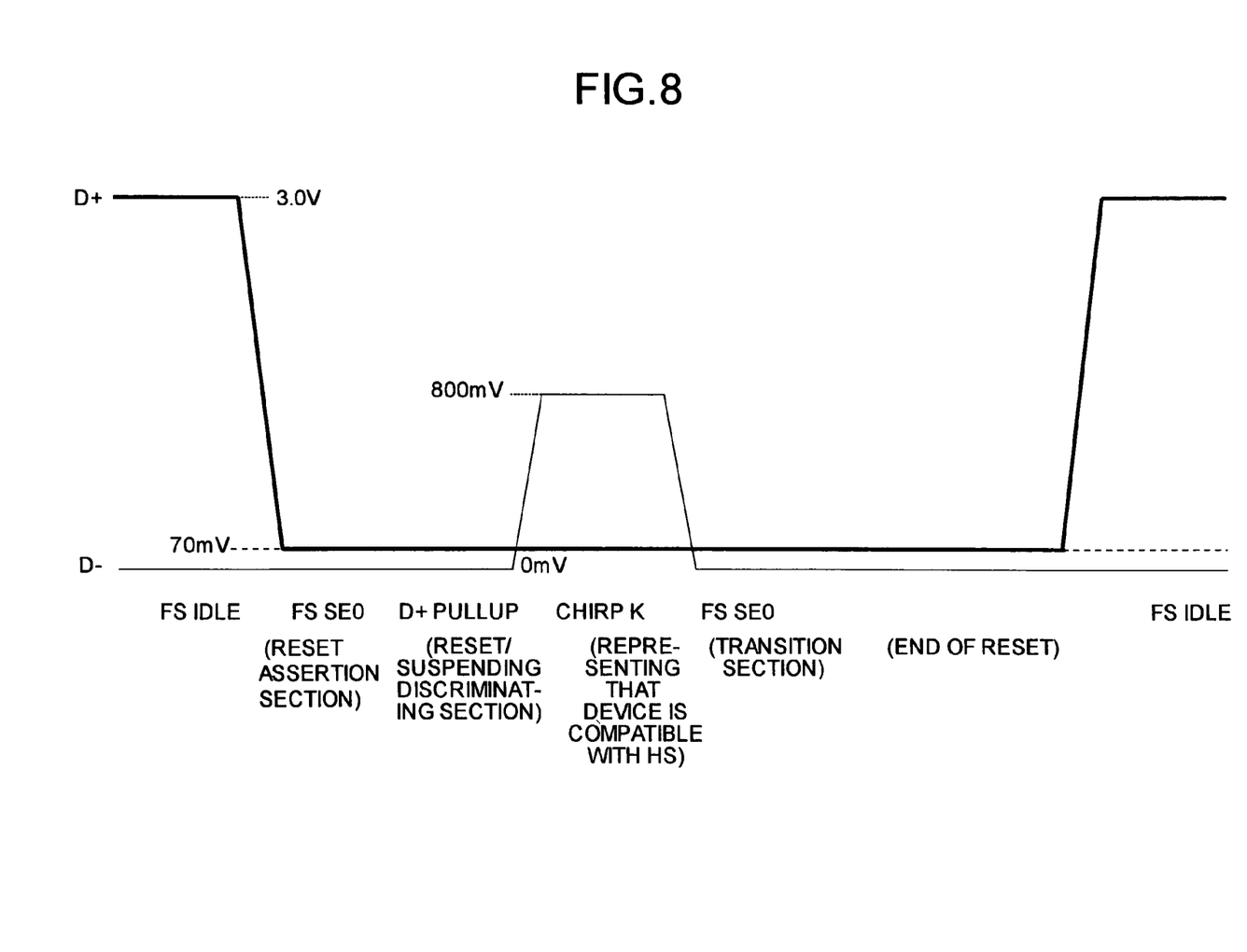
FIG. 8 depicts a change in the USB bus when a full-speed mode is selected at the time of handshaking during reset.

As shown in FIGS. 7 and 8, in an idling state in the full-speed mode, a voltage of a D+ signal of the USB bus is 3.0 volts (V), and a voltage of a D− signal thereof is 0 millivolt (mV). When this state changes into an SE0 state, a reset assertion section starts. In the SE0 state, both the D+ signal voltage and the D− signal voltage become lower than 800 mV.

A pull-up resistor is, thereafter, connected to a D+ data line, and discrimination is made whether the USB host is in a rest state or in a suspended state. When the USB host is in the reset state, a USB 2.0 compatible device sets the D− signal voltage to 800 mV (chirp K). The chirp K indicates to the host that the USB 2.0 compatible device is compatible with the high-speed mode.

The USB bus again becomes in the SE0 state. This state is a transition section in which an output side of the signal is switched from the USB 2.0 compatible device side to the USB host side. At this time, the USB 2.0 compatible device becomes in a state of waiting for a response from the USB host. When the USB host transits to the high-speed mode, the USB host alternately repeats a state (chirp K) in which the voltage of the D− signal becomes 800 mV and a state (chirp J) in which the voltage of the D+ signal becomes 900 mV, as shown in FIG. 7. Then, the USB bus again becomes in the SE0 state, and the reset ends, thereby the USB bus being in an idling state in the high-speed mode.

On the other hand, when the USB host does not detect alternate chirp K and chirp J after the transition section, which is after the chirp K by the USB 2.0 compatible device, as shown in FIG. 8, the USB 2.0 compatible device recognizes that the reset is ended by the USB host that is compatible with the USB1.1 standard (hereinafter, "FS host"), Accordingly, the USB bus becomes in an idling state in the full-speed mode.

Figure 9:
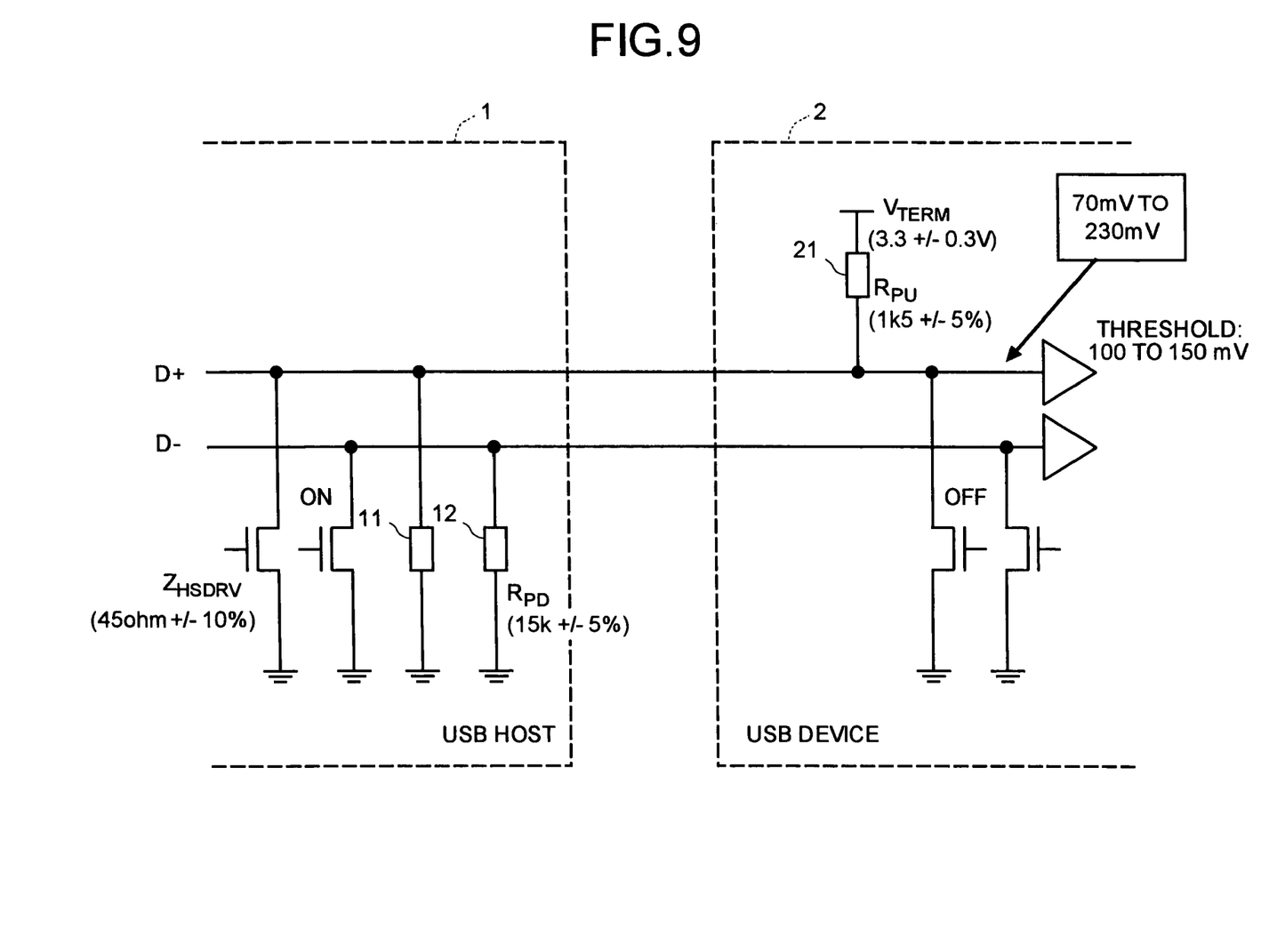
FIG. 9 is a block diagram of main portions of a USB host and the USB device in a Tiny J state.

As shown in FIG. 7, in the handshaking during rest, there is a state that is called Tiny J (for example, "USB Hardware & Software, Japanese version", written by John Garney, Ed Solari, Shelagh Callahan, Kosar Jaff, Brad Hosler, InfoCreate Co., Ltd., 1999). Tiny J is, as shown in FIG. 9, a state in which the voltage of the D+ signal becomes about 70 mV to 230 mV due to a pull-up resistor 21, pull-down resistors 11 and 12, and input/output terminals of a USB host 1 and a USB device 2 during USB reset.

However, in a conventional USB 2.0 compatible device, since its threshold level is from 100 mV to 150 mV, the following problem arises. When the D+ signal voltage becomes a value from about 70 mV to 230mV due to Tiny J in the handshaking during rest, the D+ signal that is originally at a low level is occasionally moved to a high level. Thus, the D+ signal becomes at the high level and the D− signal becomes at the low level. As a result, the USB 2.0 compatible device recognizes that the FS host is in the reset end state, and misrecognizes an HS host as the FS host. Accordingly, the USB 2.0 compatible device is connected to the HS host in the full-speed mode.

SUMMARY OF THE INVENTION

It is an object of the present invention to solve at least the above problems in the conventional technology.

A universal serial bus device according to one aspect of the present invention is connected to a universal serial bus host via a universal serial bus in a high-speed mode, and includes a receiver that receives a signal from the universal serial bus, the receiver having a variable threshold that is set to a first value; a reset detector that detects start of a reset state of the universal serial bus host; and a reset control circuit that sets, when the reset detector detects the reset state, the threshold of the receiver to a second value that is higher than a voltage of the universal serial bus in a Tiny J state.

A method for controlling a universal serial bus device according to another aspect of the present invention in handshaking between the universal serial bus device and a universal serial bus host, in which the universal serial bus device is connected to the universal serial bus host via a universal serial bus in a high-speed mode includes detecting start of a reset state of the universal serial bus host; changing, when the reset state is detected, a threshold of a receiver, the threshold being variable and set to a first value, the receiver receiving a signal from the universal serial bus, to a second value that is higher than a voltage of the universal serial bus in a Tiny J state; executing a chirp driving K;

ending the chirp driving K; detecting a state of the universal serial bus, the state including a K state and a J state; and changing the threshold of the receiver back to the first value when it is detected that the universal serial bus is in any one of the K state and the J state at a point of time when a predetermined time elapses from end of the chirp driving K while the universal serial bus remaining to be in an SE0 state or before a predetermined time elapses from the end of the chirp driving K.

A method for controlling a universal serial bus device according to still another aspect of the present invention in handshaking between the universal serial bus device and a universal serial bus host in which the universal serial bus device is connected to the universal serial bus host via a universal serial bus in a high-speed mode includes detecting start of s reset state of the universal serial bus host; changing, when the reset state is detected, a threshold of a receiver, the threshold being variable and set to a first value, the receiver receiving a signal from the universal serial bus, to a second value that is higher than a voltage of the universal serial bus in a Tiny J state; executing chirp driving K; ending the chirp driving K; detecting a state of the universal serial bus, the state including a K state and a J state; and changing the threshold of the receiver back to the first value when it is detected that the universal serial bus is repeatedly being in the K state and the J state for a predetermined number of times before a predetermined time elapses from end of the chirp driving K.

The other objects, features, and advantages of the present invention are specifically set forth in or will become apparent from the following detailed description of the invention when read in conjunction with the accompanying drawings.

DETAILED DESCRIPTION

Figure 1:
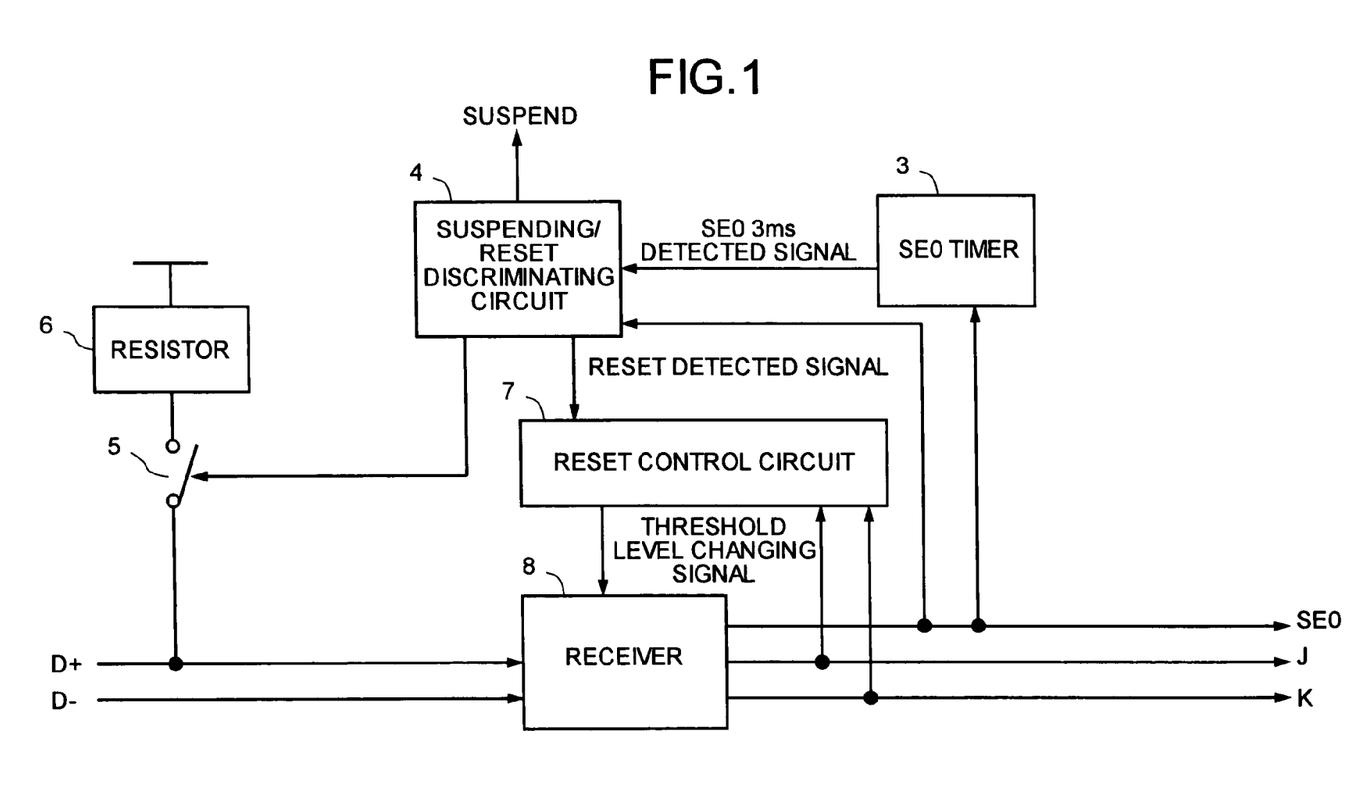
FIG. 1 is a block diagram of one example of a main portion of a USB device according to the present invention.

Exemplary embodiments of the present invention will be explained in detail with reference to the accompanying drawings. FIG. 1 is a block diagram of one example of a main portion of a USB 2.0 compatible device according to the present invention. As shown in FIG. 1, the USB 2.0 compatible device includes an SE0 timer 3, a suspending/reset discriminating circuit 4, a reset detector including a switch 5 and a pull-up resistor 6, a rest control circuit 7, and a receiver 8 for high-speed mode.

The SE0 timer 3 always counts the duration of an SE0 state of a USB bus. At the time when a counter indicates 3 milliseconds (ms) or more from start of the SE0 state, the SE0 timer 3 asserts an SE03ms detected signal to the suspending/reset discriminating circuit 4.

When the SE03ms detected signal is asserted, the suspending/reset discriminating circuit 4 switches on the switch 5, so as to connect the pull-up resistor 6 to a D+ data line. When a state of the USB bus when the pull-up resistor 6 is connected is SE0, the suspending/reset discriminating circuit 4 recognizes that the USB bus host is in the reset state, and when the state of the USB bus is not SE0, the suspending/reset discriminating circuit 4 recognizes that the USB bus host is suspended. When the suspending/reset discriminating circuit 4 recognizes that the USB bus host is in the reset state, the suspending/rest discriminating circuit 4 asserts a reset detected signal to the reset control circuit 7.

When the reset detected signal is asserted, the reset control circuit 7 asserts a threshold level changing signal to the receiver 8. When the threshold level changing signal is asserted, the receiver 8 changes a threshold level. Further, the receiver 8 outputs an SE0 signal, a J signal representing a J state, or a K signal representing a K state according to a D+ signal and a D− signal. The reset control circuit 7 recognizes the J signal or the K signal and changes the threshold level of the receiver 8 back to an original level. The SE0 timer 3 recognizes the SE0 signal output from the receiver 8.

Figure 2:
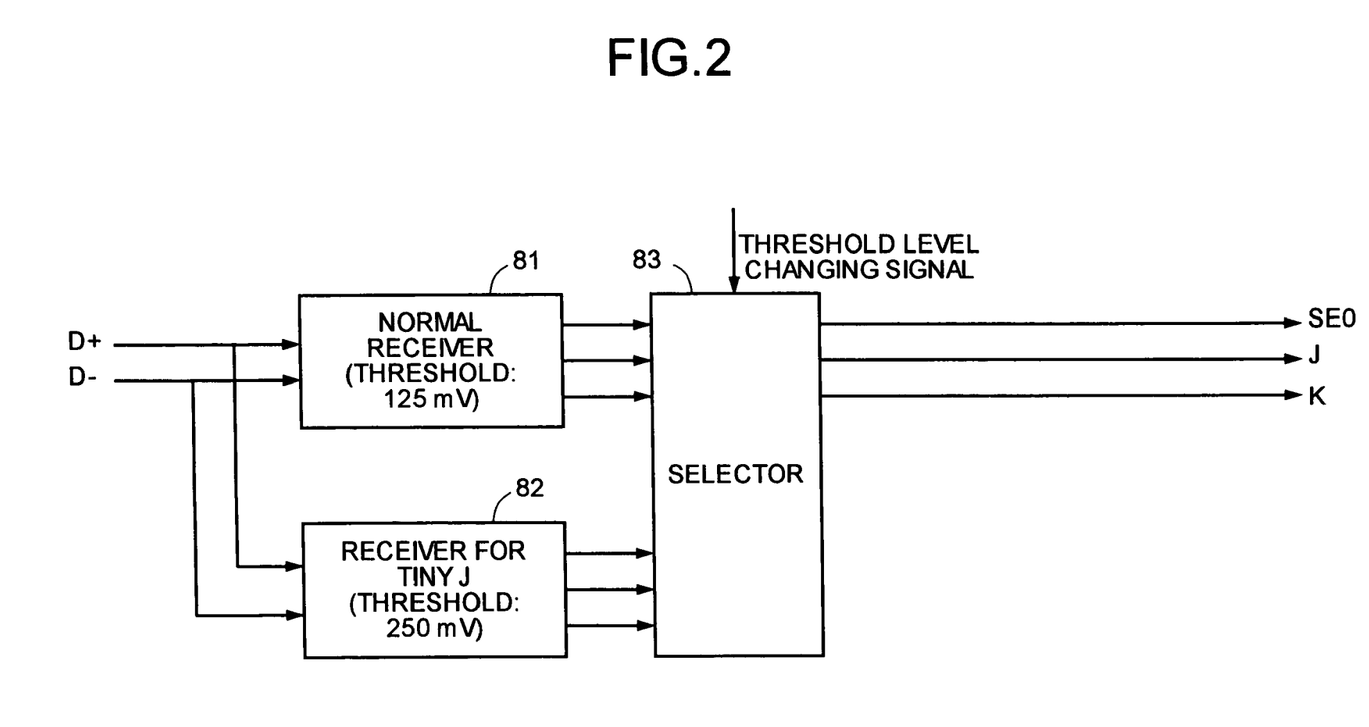
FIG. 2 is a block diagram of one example of a receiver of the USB device according to the present invention.

FIG. 2 is a block diagram of a first example of an inner configuration of the receiver 8. As shown in FIG. 2, the receiver 8 includes a normal receiver 81 of which threshold is, for example, 125mV, a receiver 82 for Tiny J of which threshold is, for example, 250 mV, and a selector 83. The D+ signal and the D− signal are supplied to both the normal receiver 81 and the receiver 82 for Tiny J.

According to the supplied D+ signal and the D− signal, the normal receiver 81 asserts or negates the SE0 signal, the J signal, or the K signal to be supplied to the selector 83 based on the threshold of 125 mV. The receiver 82 for Tiny J asserts or negates these signals based on the threshold of 250 mV. Specifically, when both the D+ signal and the D− signal are lower than, for example, 800 mV, the normal receiver 81 and the receiver 82 for Tiny J assert the SE0 signal (SE0 state). When any one of the signals is, for example, 800 mV or more, the normal receiver 81 and the receiver 82 for Tiny J negate the SE0 signal.

When the D+ signal has a value of the thresholds or more, the normal receiver 81 and the receiver 82 for Tiny J assert the J signal (negate the K signal). When the D− signal has a value of the thresholds or more, the normal receiver 81 and the receiver 82 for Tiny J assert the K signal (negate the J signal). When the threshold level changing signal from the reset control circuit 7 is asserted, the selector 83 selects the output signal from the receiver 82 for Tiny J, and when the threshold level changing signal is negated, it selects the output signal from the normal receiver 81.

Figure 3:
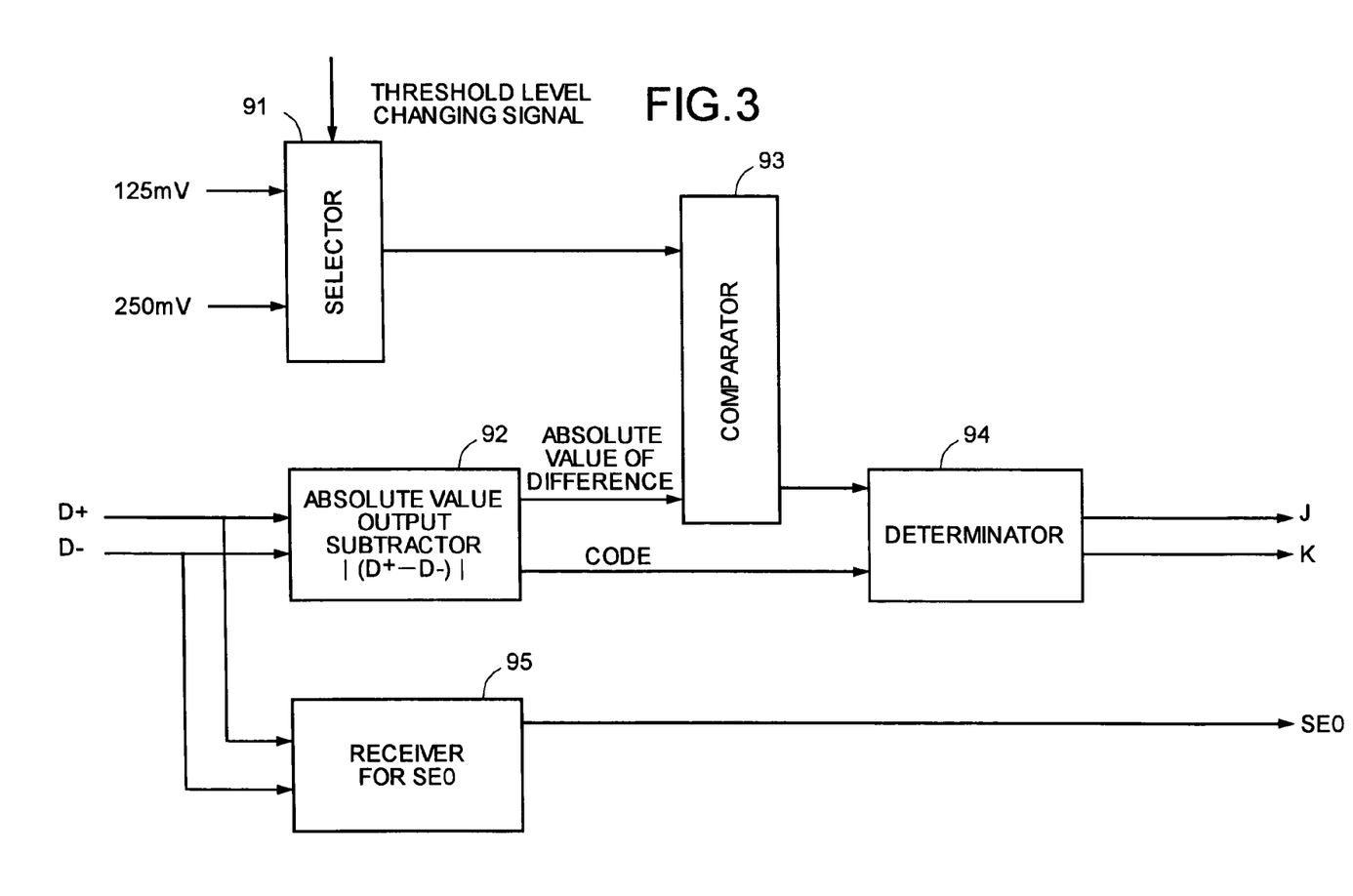
FIG. 3 is a block diagram of another example of the receiver of the USB device according to the present invention.

The receiver 8 may include configuration as shown in FIG. 3. FIG. 3 is a block diagram of a second example of the internal configuration of the receiver 8. In the example shown in FIG. 3, the receiver 8 includes a selector 91, an absolute value output subtractor 92, a comparator 93, a determinator 94, and a receiver 95 for SE0.

When the threshold level changing signal supplied from the reset control circuit 7 is asserted, the selector 91 selects the threshold of, for example, 250 mV for Tiny J. When the threshold level changing signal is negated, the selector 91 selects the threshold of 125 mV for normal operation, for example. The absolute value output subtractor 92 obtains an absolute value of a difference between the D+ signal voltage and the D− signal voltage, namely, the value of |([D+signal]−[D−signal])| and a sign when the D− signal voltage is subtracted from the D+ signal voltage. The comparator 93 compares the threshold selected with the absolute value obtained.

The determinator 94 determines the J state or the K state based on a comparison result obtained by the comparator 93 and the sign obtained by the absolute value output subtractor 92. Specifically, when the absolute value is the thresholds or more and the sign is plus, the J signal is asserted and the K signal is negated (J state). When the sign is minus, the J signal is negated and the K signal is asserted (K state). On the other hand, when the absolute value is smaller than the thresholds, the signals are invalid. When both the D+ signal and the D− signal are smaller than, for example, 800 mV, the receiver 95 for SE0 asserts the SE0 signal (SE0 state). When one of the signals is, for example, 800 mV or more, the receiver 95 negates the SE0 signal.

Figure 4:
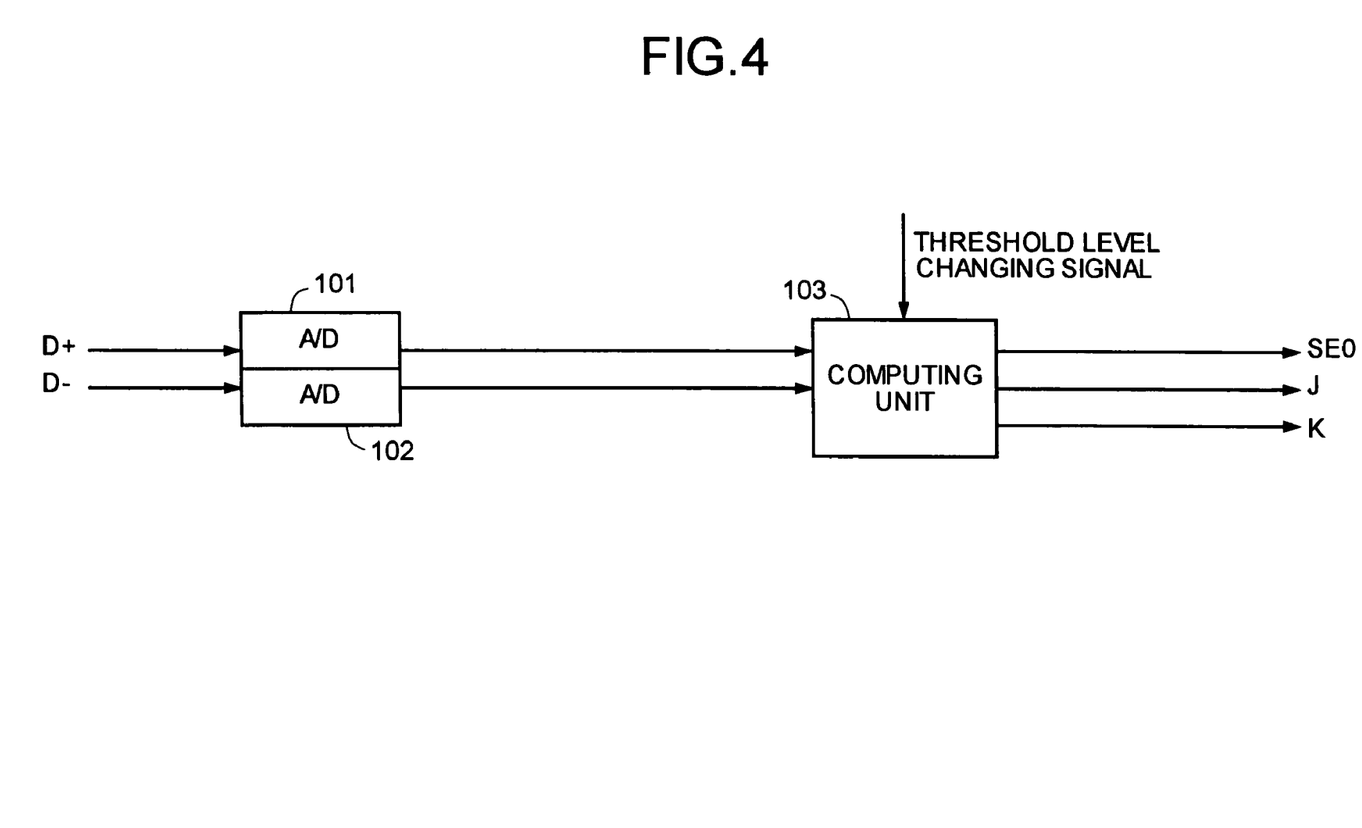
FIG. 4 is a block diagram of still another example of the receiver of the USB device according to the present invention.

The receiver 8 may include a configuration as shown in FIG. 4. FIG. 4 is a block diagram of a third example of the internal configuration of the receiver 8. In the example shown in FIG. 4, the receiver 8 includes analog/digital (A/D) converters 101 and 102, and a computing unit 103. The A/D converter 101 converts the D+ signal into a digital signal. The A/D converter 102 converts the D− signal into a digital signal. The computing unit 103 asserts or negates the SE0 signal, the J signal, and the K signal according to the outputs (digital converted values) from the A/D converters 101 and 102, and the threshold level changing signal supplied from the reset control circuit 7.

When both the digital converted value of the D+ signal and the digital converted value of the D− signal are smaller than, for example, 800 mV, the computing unit 103 asserts the SE0 signal (SE0 state). When one of the signals is, for example, 800 mV or more, the computing unit 103 negates the SE0 signal. When the digital converted value of the D+ signal is, for example, 150 mV or more, the computing unit 103 asserts the J signal (negates the K signal) so as to bring the USB bus into the J state. When the digital converted value of the D− signal is, for example, 150 mV or more, the computing unit 103 asserts the K signal (negates the J signal) so as to bring the USB bus into the K state. When both the digital converted value of the D+ signal and the digital converted value of the D− signal are smaller than, for example, 150 mV, the signals are invalid.

Figure 5:
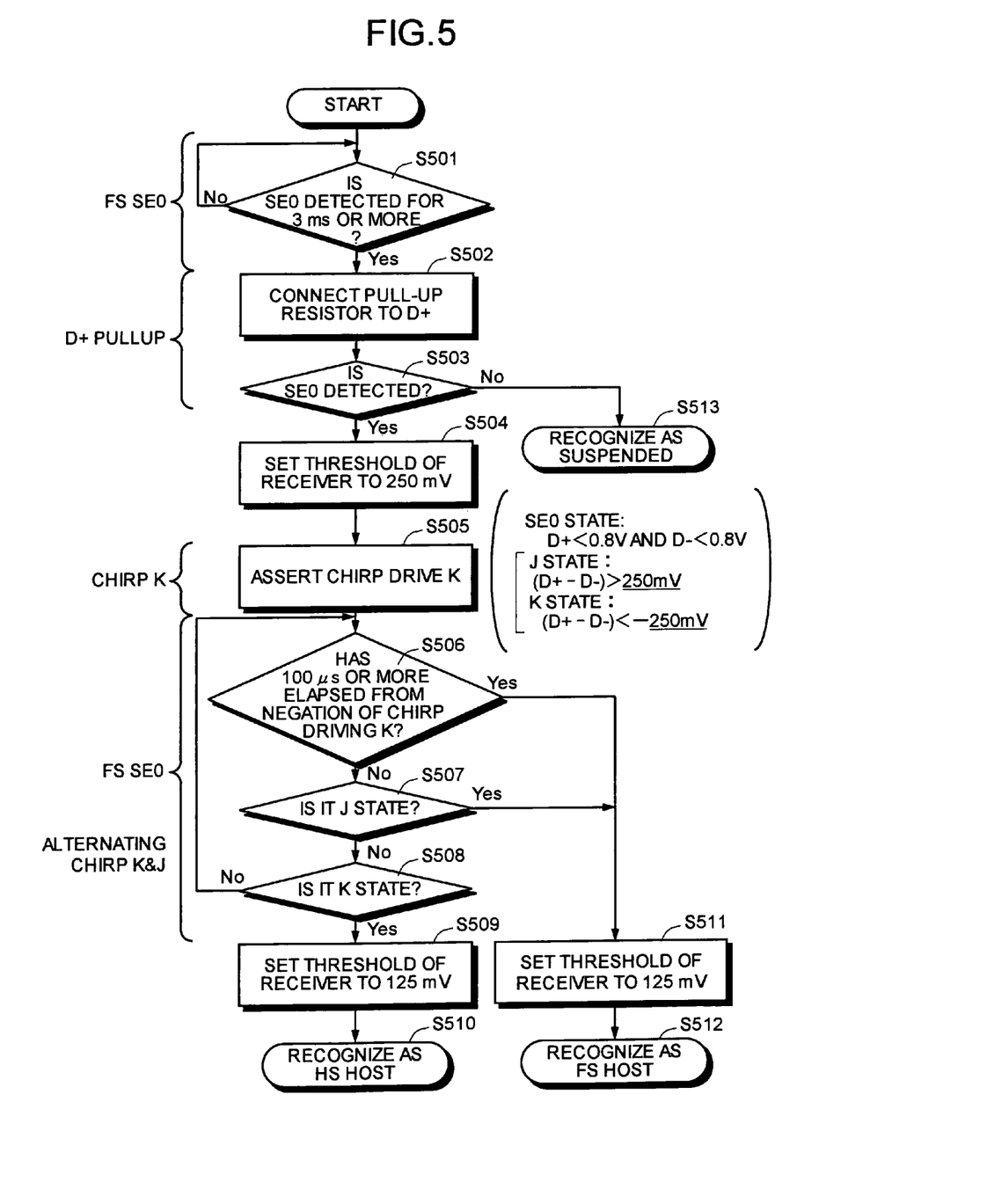
FIG. 5 is a flowchart of one example of control of the USB device at the time of handshaking according to the present invention.

FIG. 5 is a flowchart of a control for the USB device at the time of handshaking. As shown in FIG. 5, when the USB bus is brought into the SE0 state and when the handshaking during reset is started, the SE0 timer 3 starts to count the duration of the SE0 state. When the SE0 state continues for, for example, 3 ms or more ("YES" at step S501), the SE0 timer 3 asserts an SE03ms detected signal to the suspending/reset discriminating circuit 4.

The suspending/reset discriminating circuit 4 switches on the switch 5, and connects the pull-up resistor 6 to the D+ data line (step S502). The suspending/reset discriminating circuit 4 discriminates whether the USB bus is in the SE0 state (step S503). Accordingly, when the USB bus is in the SE0 state ("YES" at step S503), the suspending/reset discriminating circuit 4 recognizes the host to be in the reset state, and asserts the reset detected signal to the reset control circuit 7.

The reset control circuit 7 asserts the threshold level changing signal to the receiver 8 for high-speed mode. Accordingly, the receiver 8 changes the threshold into, for example, 250 mV (step S504). A driver (not shown in FIG. 1) asserts the D− signal so as to execute chirp driving K (step S505). The driver negates the D− signal so as to end the chirp driving K, and maintains the SE0 state of the USB bus until the USB bus is brought into the J state or the K state (step S506).

When the reset control circuit 7 detects that the USB bus is in the K state ("YES" at step S508), the rest control circuit 7 negates the threshold level changing signal to the receiver 8. Accordingly, the receiver 8 for high-speed mode changes the threshold back to, for example, 125 mV (step S509). In such a manner, the USB 2.0 compatible device recognizes that a host to which the USB 2.0 compatible device is connected is an HS host (step S510), and the handshaking is ended so that the reset is ended.

On the other hand, after the chirp driving K is ended, when the reset control circuit 7 detects that the USB bus is brought into the J state ("YES" at step S507), the reset control circuit 7 negates the threshold level changing signal to the receiver 8 for high-speed mode. The receiver 8 for high-speed mode changes the threshold back to, for example, 125 mV (step S511). In such a manner, the USB 2.0 compatible device recognizes that a host to which the USB 2.0 compatible device is connected is an FS host (step S512), and the handshaking is ended so that the reset is ended.

After the chirp driving K is ended, when predetermined time, for example, 100 microseconds or more elapses with the USB bus being in the SE0 state ("YES" at step S506), the threshold of the receiver 8 for high-speed mode is changed back to, for example, 125 mV (step S511) in a similar manner as a case when the J state is detected. Accordingly, the USB 2.0 compatible device recognizes that a host to which the USB 2.0 compatible device is connected is the FS host (step S512). Then, the handshaking is ended, and the reset is ended. As a result of discriminating the state of the USB bus at step S503, when the USB bus is not in the SE0 state ("NO" at step S503), the suspending/reset discriminating circuit 4 recognizes that the host is in the suspended state (step S513), and the handshaking is ended.

Figure 6:
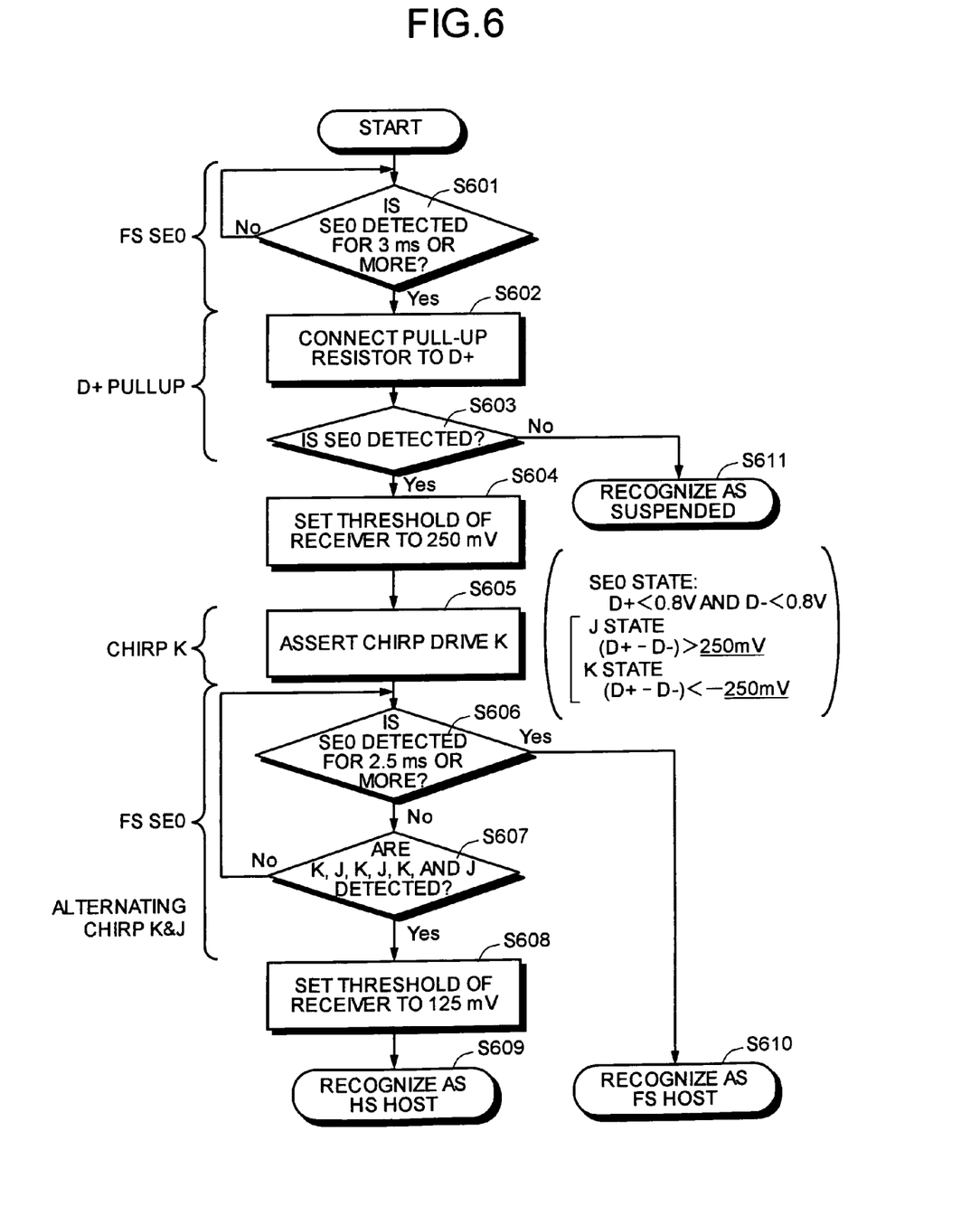
FIG. 6 is a flowchart of another example of the control of the USB device at the time of handshaking according to the present invention.

Instead of detecting the USB bus being in the J state or detecting the USB bus being in the K state, a control may be performed as explained in a following second example. FIG. 6 is a flowchart of another control for the USB device at the time of handshaking. As shown in FIG. 6, when the handshaking during the reset state of the host is started, steps S601 to S605 are executed sequentially. Steps S601, S602, S603, S604, and S605 are the same as steps S501, S502, S503, S504, and S505 explained above. Therefore, redundant explanation is omitted.

When the reset control circuit 7 detects a state in which the USB bus is alternately in the K state and the J state is repeated for a predetermined number of times, for example, at least three times ("YES" at step S607) before a predetermined time ("NO" at step S606), for example, 2.5 ms elapses from the end of the chirp driving K while the USB bus being in the SE0 state, the reset control circuit 7 negates the threshold level changing signal to the receiver 8 for high-speed mode. Accordingly, the receiver 8 for high-speed mode changes the threshold back to, for example, 125 mV (step S608). In such a manner, the USB 2.0 compatible device recognizes that a host to which the USB 2.0 compatible device is connected is the HS host (step S609), and the handshaking is ended so that the reset is ended.

When, for example, 2.5 ms or more elapses from the end of the chirp driving K while the USB bus being in the SE0 state ("YES" at step S606), the USB 2.0 compatible device recognizes that a host to which the USB 2.0 compatible device is connected is the FS host (step S610). Then, the handshaking is ended, and the reset is ended. As a result of discriminating the state of the USB bus at step S603, when the USB bus is not in the SE0 state ("NO" at step S603), the suspending/reset discriminating circuit 4 recognizes that the host is in the suspended state (step S611), and the handshaking is ended.

According to the embodiments, the threshold of the receiver 8 for high-speed mode is changed into a value that is higher than the voltage of the USB bus in the Tiny J state, for example, 250 mV when the reset state is detected. Accordingly, the detection can be properly made that the USB bus is in the K state according to the response from the USB host without detecting Tiny J. The HS host is not, therefore, misrecognized as the FS host and is properly recognized as the HS host. Thus, the USB device can be connected to the HS host properly in the high-speed mode.

The present invention is not limited to the above embodiments and various modifications may be made. For example, the threshold of the receiver 8, the detecting time of the SE0 state may take various values according to the standards of the USB. The threshold of the receiver 8 after the reset is not limited to 125 mV and may be a different value within the standards of USB.

According to the present invention, it is possible to detect properly that the USB bus is in the K state without detecting Tiny J. Therefore, it is possible to prevent the HS host from being misrecognized as the FS host, and to properly recognize the HS host, so that the USB device can be connected to the HS host in the high-speed mode.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A universal serial bus device that is connectable to a universal serial bus host via a universal serial bus in a high-speed mode, comprising:
   a receiver that receives a signal from the universal serial bus;
   a reset detector that detects start of a reset state of the universal serial bus host; and
   a reset control circuit that
      changes, when the reset state is detected by the reset detector, a threshold of the receiver from a first value to a second value based on a level changing signal from the receiver, the second value being higher than a voltage of the universal serial bus in a Tiny J state, the Tiny J state indicating a value of the voltage of the universal serial bus, and
      returns the threshold of the receiver back to the first value when a chirp driving K asserted by the universal serial bus host is detected and the level changing signal is negated subsequent to the chirp driving K, where the chirp driving K is when a predetermined signal is asserted by the universal serial bus device.

2. The universal serial bus device according to claim 1, wherein
   the reset control circuit detects a state of the universal serial bus subsequent to the chirp driving K asserted by the universal serial bus device, and
   when the state detected is a J state, the reset control circuit changes the threshold of the receiver back to the first value.

3. The universal serial bus device according to claim 1, wherein
   the reset control circuit detects a state of the universal serial bus subsequent to the chirp driving K asserted by the universal serial bus device, and
   when it is detected that the universal serial bus is repeatedly in a K state and in a J state for a predetermined number of times, the reset control circuit changes the threshold of the receiver back to the first value.

4. The universal serial bus device according to claim 1, wherein the reset detector includes
   a timer that counts duration of an SE0 state of the universal serial bus;
   a pull-up resistor that is connected to a D+ data line of the universal serial bus when the timer counts a predetermined time; and
   a reset discriminating circuit that detects the state of the universal serial bus of which the D+ data line is connected to the pull-up resistor, and recognizes, when the state detected is the SE0 state, the universal serial bus host is in the reset state.

5. The universal serial bus device according claim 1, wherein the receiver includes
   a receiver for normal operation having the first value;
   a receiver for Tiny J having the second value that is higher than a voltage of the universal serial bus in the Tiny J state; and
   a selector that selects an output signal from among an output signal from the receiver for normal operation and an output signal from the receiver for Tiny J based on an output signal from the reset control circuit.

6. The universal serial bus device according to claim 1, wherein the receiver includes
   a selector that selects a value of the threshold of the receiver from among the first value that is for a normal operation and the second value based on an output signal from the reset control circuit;
   a subtractor that subtracts a value of a voltage of a D- signal from a value of a voltage of a D+ signal of the universal serial bus to obtain a sign and an absolute value of a value obtained as a result of subtraction;
   a comparator that compares the absolute value obtained with the value of the threshold selected;
   a determinator that determines which one of a J state and a K state the universal serial bus is in based on a comparison result obtained by the comparator and the sign obtained by the subtractor; and
   a receiver for SE0 that detects that the universal serial bus is in an SE0 state.

7. The universal serial bus device according to claim 1, wherein the receiver includes
   a first analog/digital converter that converts a D+ signal of the universal serial bus into a digital signal;
   a second analog/digital converter that converts a D- signal into a digital signal; and
   a computing unit that computes which one of a J state or a K state the universal serial bus is in based on an output value of the first analog/digital converter, an output value of the second analog/digital converter, and an output signal from the reset control circuit.

8. The universal serial bus device according to claim 1, wherein the reset control circuit changes the threshold of the receiver from the first value to the second value before the chirp driving K is asserted by the universal serial bus device.

9. The universal serial bus device according to claim 8, wherein
   the reset control circuit detects a state of the universal serial bus subsequent to the chirp driving K asserted by the universal serial bus device, and
   when the state detected is a J state, the reset control circuit changes the threshold of the receiver back to the first value and the device recognizes the host as a full speed host, and
   when the state detected is a K state, the reset control circuit changes the threshold of the receiver back to the first value and the device recognizes the host as a high speed host.

10. A method for a universal serial bus device that is connectable to a universal serial bus host via a universal serial bus in a high-speed mode and includes a receiver that receives a signal from the universal serial bus, comprising:
    detecting start of a reset state of the universal serial bus host;
    changing, when the reset state is detected at the detecting, a threshold of the receiver from a first value to a second value based on a level changing signal from the receiver, the second value being higher than a voltage of the universal serial bus in a Tiny J state; and
    returning the threshold of the receiver back to the first value when a chirp driving K asserted by the universal serial bus host is detected and the level changing signal is negated subsequent to a chirp driving K asserted by the universal serial bus device.

* * * * *